(12) United States Patent
Iguchi

(10) Patent No.: US 11,717,925 B2
(45) Date of Patent: Aug. 8, 2023

(54) MACHINE TOOL

(71) Applicant: OKUMA Corporation, Aichi (JP)

(72) Inventor: Kenji Iguchi, Aichi (JP)

(73) Assignee: OKUMA CORPORATION, Aichi (JP)

(*) Notice: Subject to any disclaimer, the term of this patent is extended or adjusted under 35 U.S.C. 154(b) by 0 days.

(21) Appl. No.: 16/663,454

(22) Filed: Oct. 25, 2019

(65) Prior Publication Data

US 2020/0130123 A1  Apr. 30, 2020

(30) Foreign Application Priority Data

Oct. 26, 2018 (JP) ................. 2018-202180

(51) Int. Cl.

| | | |
|---|---|---|
| *B23Q 3/155* | (2006.01) | |
| *B23Q 11/08* | (2006.01) | |
| *B25J 15/04* | (2006.01) | |
| *B23Q 17/00* | (2006.01) | |
| *B23Q 11/00* | (2006.01) | |

(52) U.S. Cl.
CPC ...... *B23Q 3/15566* (2013.01); *B23Q 11/0825* (2013.01); *B23Q 11/0891* (2013.01); *B25J 15/0491* (2013.01); *B23Q 11/0042* (2013.01); *B23Q 17/00* (2013.01); *B23Q 2003/15537* (2016.11); *Y10T 483/115* (2015.01); *Y10T 483/1702* (2015.01)

(58) Field of Classification Search
CPC ......... Y10T 483/115; Y10T 409/30392; Y10T 292/1039–1094; Y10T 70/5128–5142; B23Q 3/155–3/15793; B23Q 11/08–11/0891; B25J 15/0491; A47B 88/403; E05B 2065/469; E05B 65/46–65/468; E05B 65/44; E05C 3/047; E05C 3/00–3/40
USPC .............. 483/3; 409/134; 219/121.6–121.86; 312/286, 334.47; 292/240–212; 70/85–88
See application file for complete search history.

(56) References Cited

U.S. PATENT DOCUMENTS 4,601,094 A * 7/1986 Myers ................ B23Q 3/15539
                                                                         483/3
4,644,635 A * 2/1987 Murai ...................... B23Q 1/54
                                                                         483/54

(Continued)

FOREIGN PATENT DOCUMENTS

| CN | 105196104 A | 12/2015 |
|---|---|---|
| CN | 105364622 A | 3/2016 |

(Continued)

OTHER PUBLICATIONS

Definition of "robot"; Merriam-Webster's Collegiate Dictionary, 10th ed., p. 1013, copyright 1998.*

(Continued)

*Primary Examiner* — Erica E Cadugan
(74) *Attorney, Agent, or Firm* — Cantor Colburn LLP

(57) ABSTRACT

A machine tool equipped with a robot includes a stocker which has one or more effector holder units for holding an end effector to be mounted on the robot, in which the stocker can be stored within a casing of the machine tool. At least a part of the stocker is configured to be bilaterally advanceable into a machining chamber of the machine tool and an external region located outside the machine tool.

4 Claims, 8 Drawing Sheets

(56) References Cited

U.S. PATENT DOCUMENTS

| | | | | |
|---|---|---|---|---|
| 4,878,288 A * | 11/1989 | Messner | ............... | B21D 37/145 |
| | | | | 483/29 |
| 5,114,193 A * | 5/1992 | Nass | ........................ | E05C 3/047 |
| | | | | 292/67 |
| 6,750,425 B2 * | 6/2004 | Mukae | ............... | B23K 26/0884 |
| | | | | 219/121.78 |
| 7,292,910 B2 * | 11/2007 | Gmeiner | ............. | B23K 26/0884 |
| | | | | 318/568.13 |
| 8,511,765 B1 * | 8/2013 | Chen | ........................ | A47B 88/57 |
| | | | | 312/286 |
| 9,375,817 B2 * | 6/2016 | Nakahata | ............ | B23Q 3/15533 |
| 9,616,526 B2 * | 4/2017 | Sonner | ................... | B23K 26/21 |
| 2007/0278194 A1 * | 12/2007 | Hoelsher | ............... | G02B 6/4296 |
| | | | | 219/121.6 |
| 2017/0066094 A1 * | 3/2017 | Hoshi | ................ | B23Q 3/15539 |
| 2017/0252928 A1 * | 9/2017 | Fukurotani | .......... | B25J 15/0491 |
| 2017/0312873 A1 * | 11/2017 | Itoh | ........................... | B23Q 7/04 |
| 2017/0326700 A1 | 11/2017 | Morimura | | |
| 2018/0250809 A1 | 9/2018 | Morimura | | |
| 2019/0099834 A1 * | 4/2019 | Bunz | ........................ | B29C 64/20 |

FOREIGN PATENT DOCUMENTS

| | | | |
|---|---|---|---|
| CN | 205201147 U | | 5/2016 |
| CN | 107363838 A | | 11/2017 |
| CN | 211163065 U | * | 8/2020 |
| CN | 113070711 A | * | 7/2021 |
| DE | 102016209285 B3 | * | 8/2017 |
| DE | 102018122165 A1 | * | 3/2020 |
| EP | 1413392 A1 | * | 4/2004 |
| EP | 3895849 A1 | * | 10/2021 |
| FR | 2907357 A1 | * | 4/2008 |
| JP | H05008141 A | | 1/1993 |
| JP | H06079591 A | | 3/1994 |
| JP | 2009-006455 A | * | 1/2009 |
| JP | 2017154207 A | | 9/2017 |
| JP | 2018144131 A | | 9/2018 |
| KR | 10-0779805 B1 | * | 11/2007 |

OTHER PUBLICATIONS

Machine Translation of KR-10-0779805, which KR '805 was published Nov. 2007.*
Machine Translation of CN 113070711, which CN '711 was published Jul. 2021.*
Machine Translation of DE 102018122165, which DE '165 was published Mar. 2020.*
JPO Notice of Reasons for Refusal for corresponding JP Application No. 2018-202180; dated May 10, 2022.
CNIP The First Office Action for corresponding CN Application No. 201911033479.8; dated Nov. 28, 2022.
CNIPA The Second Office Action for corresponding CN Application No. 201911033479.8; dated Mar. 22, 2023.

* cited by examiner

MACHINE TOOL

CROSS REFERENCE TO RELATED APPLICATION

The present invention claims priority under 35 U.S.C. § 119 to Japanese Patent Application No. 2018-202180 filed on Oct. 26, 2018, the entire content of which is incorporated herein by reference.

TECHNICAL FIELD

This specification discloses a machine tool suitable for coordinated operation with a robot.

BACKGROUND

Machine tools have been required to be further automated and further improved in efficiency. To satisfy such requirements, it has been suggested that a robot operated in coordination with a machine tool should be installed in the machine tool. For example, JP 2018-144131 A (hereinafter, referred to as Patent Document 1) suggests installing an articulated robot in the inside of a machine tool, and causing the articulated robot to perform various tasks. Most of such articulated robots are equipped with an end effector capable of exerting a predetermined action on a target object. In Patent Document 1, multiple types of end effectors are provided and placed on standby either inside or outside a machining chamber, and the end effector to be mounted on the robot is replaced with another type of the end effector depending on uses. When configured in this way, general versatility of the robot can be further improved.

CITATION LIST

Patent Literature

Patent Document 1: JP 2018-144131 A

Arranging the end effectors to be replaced within the machining chamber in the standby state will, of course, raise a problem in that inner space of the machining chamber is reduced. As a measure to solve the problem, there may be considered externally arranging the end effectors to be replaced and placing them on standby in the vicinity of the machine tool, for the purpose of securing space within the machining chamber. However, in this case, workability of an operator working around the machine tool will be deteriorated.

Alternatively, as another measure there can be considered arranging the end effectors to be replaced at a location some distance from the machine tool. In this case, however, a movable range of the robot must be broadened for allowing the robot to automatically change the end effectors by itself. Because there is a necessity, in general, to enclose the movable range of the robot with a safety fence or the like, the robot in this case needs a very large safety fence, thereby causing increases in footprint and costs.

Under the circumstances, this specification discloses a machine tool including a stocker for end effectors that can lead to space savings without impairing workability of an operator or a robot.

SUMMARY

In an aspect of the disclosure, a machine tool disclosed herein is a machine tool equipped with a robot, and the machine tool includes a stocker which is configured to include at least one effector holder unit for holding an end effector to be mounted on the robot, in which the stocker is further configured to be storable within a casing of the machine tool.

When configured as described above, because there is no need to place the stocker for the end effector inside a machining chamber or outside the machine tool, space savings can be realized, without impairing workability of an operator or a robot.

In another aspect of the disclosure, at least a part of the stocker may be configured to be bilaterally advanceable into the machining chamber of the machine tool and into an external region located outside the machine tool.

When the stocker is configured to be bilaterally advanceable into the machining chamber and the external region, both the robot and an operator can have access to the stocker.

In the above configuration, the machine tool may further include a first slide mechanism which is configured to retain the stocker in a state slidable into either the machining chamber or the external region, and a second slide mechanism which is configured to retain the stocker together with the first slide mechanism in a state slidable into both the machining chamber and the external region.

In this case, the second slide mechanism slidably retains the stocker together with the first slide mechanism. In other words, the first slide mechanism and the second slide mechanism are layered in a master and slave form. This form can help minimize in size an arrangement for causing the stocker to be bilaterally slid toward the inside of the machining chamber and toward the outside of the machine tool.

In the above case, the first slide mechanism may be configured to retain the stocker in a state slidable into the external region, and the second slide mechanism may be configured to retain the first slide mechanism and the stocker in a state slidable into a region inside the machine tool. In this configuration, the sliding motion using the first slide mechanism is carried out manually, and the machine tool may further include a lock mechanism for enabling and disabling the sliding motion associated with the first slide mechanism.

When the lock mechanism is included, the first slide mechanism can be prevented from getting slid when the stocker is advanced into the machine chamber, which can help stabilize the position of the stocker within the machining chamber.

According to the machine tool disclosed herein, space savings can be realized without impairing workability of the operator or the robot.

BRIEF DESCRIPTION OF DRAWINGS

Embodiments of the present disclosure will be described based on the following figures, wherein.

DESCRIPTION OF EMBODIMENTS

Figure 1:
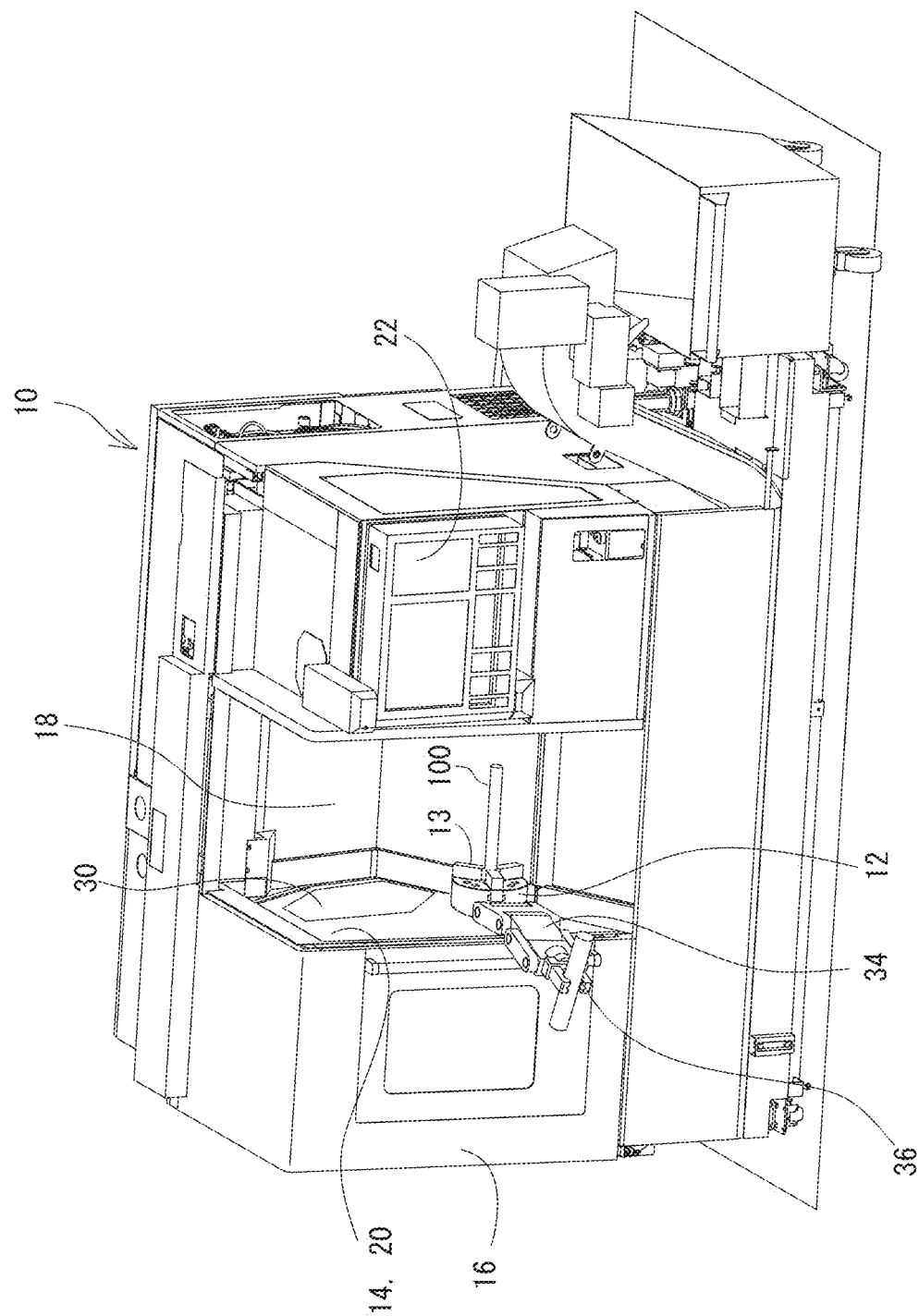
FIG. 1 is a perspective view showing a machine tool with its door being opened.
Figure 2:
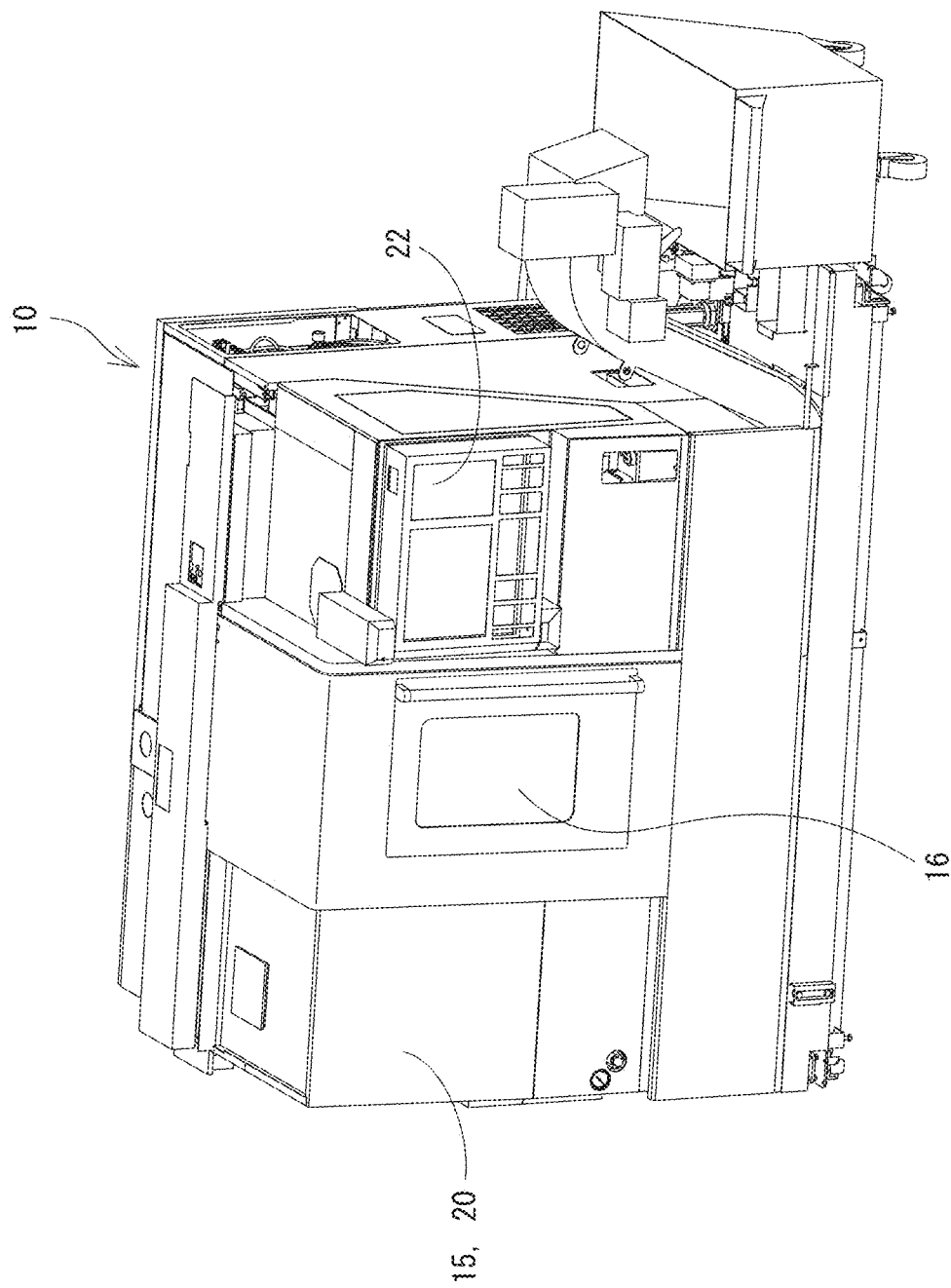
FIG. 2 is a perspective view showing the machine tool with its door being closed.
Figure 3:
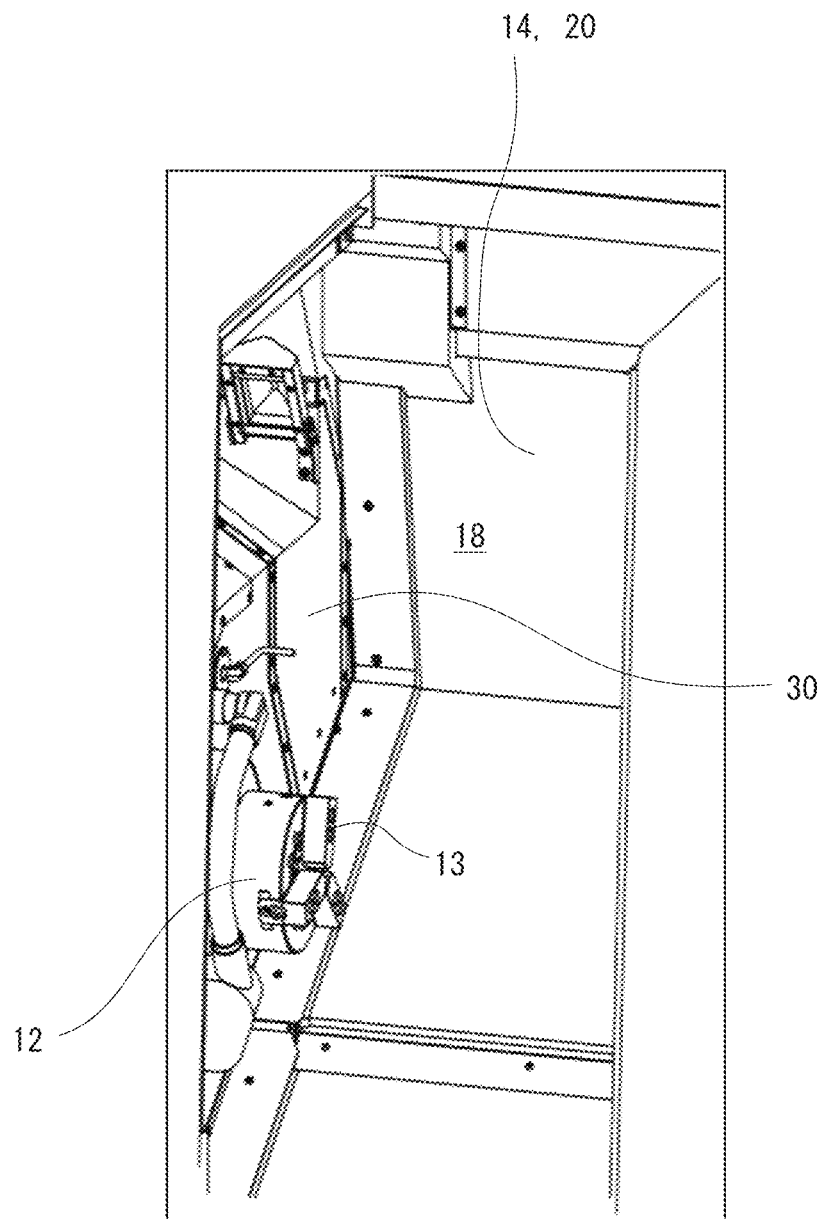
FIG. 3 is a perspective view showing a machining chamber in a state where a stocker is stored.
Figure 4:
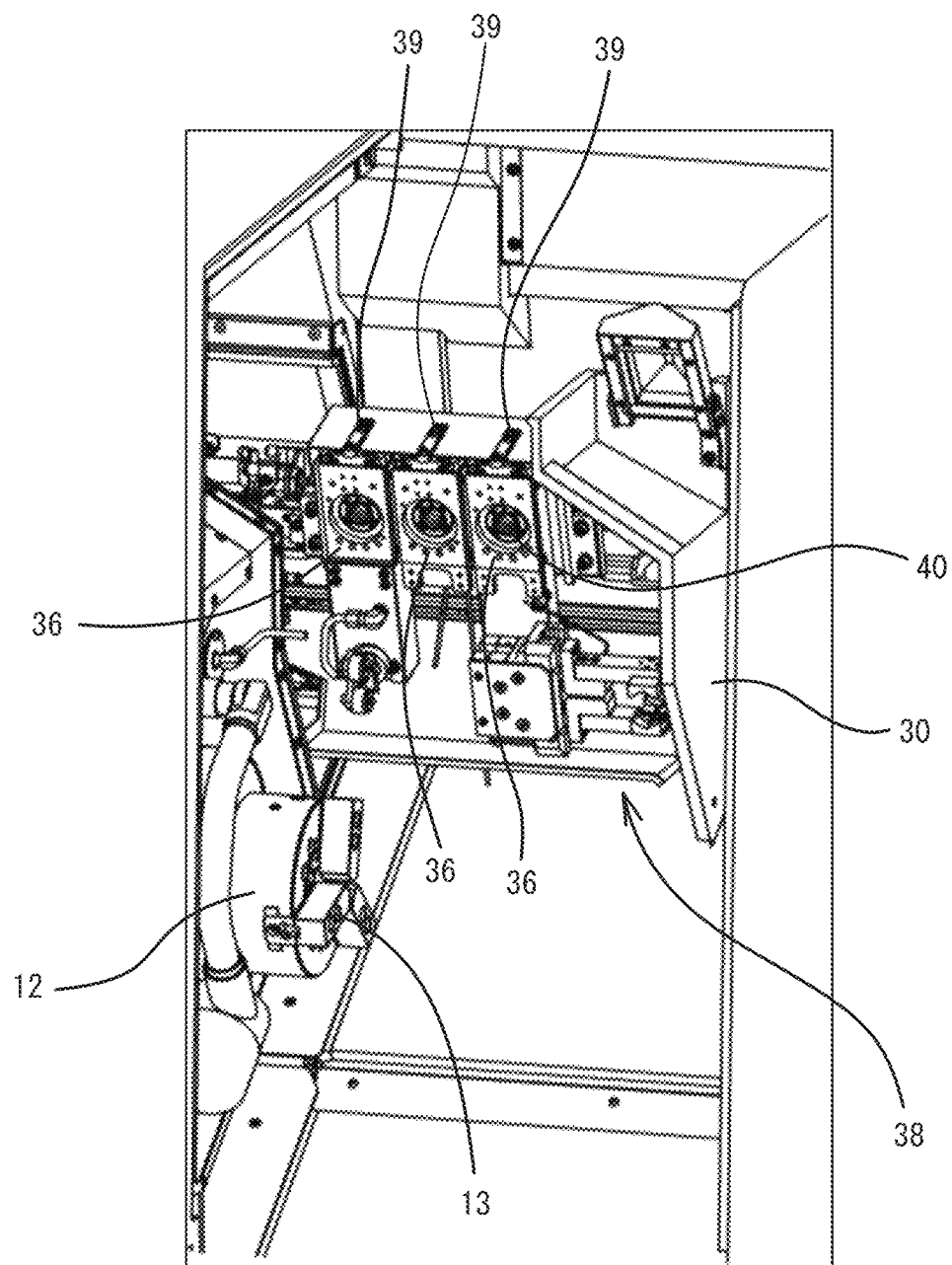
FIG. 4 is a perspective view showing the machining chamber in a state where the stocker is advanced into the machining chamber.
Figure 5:
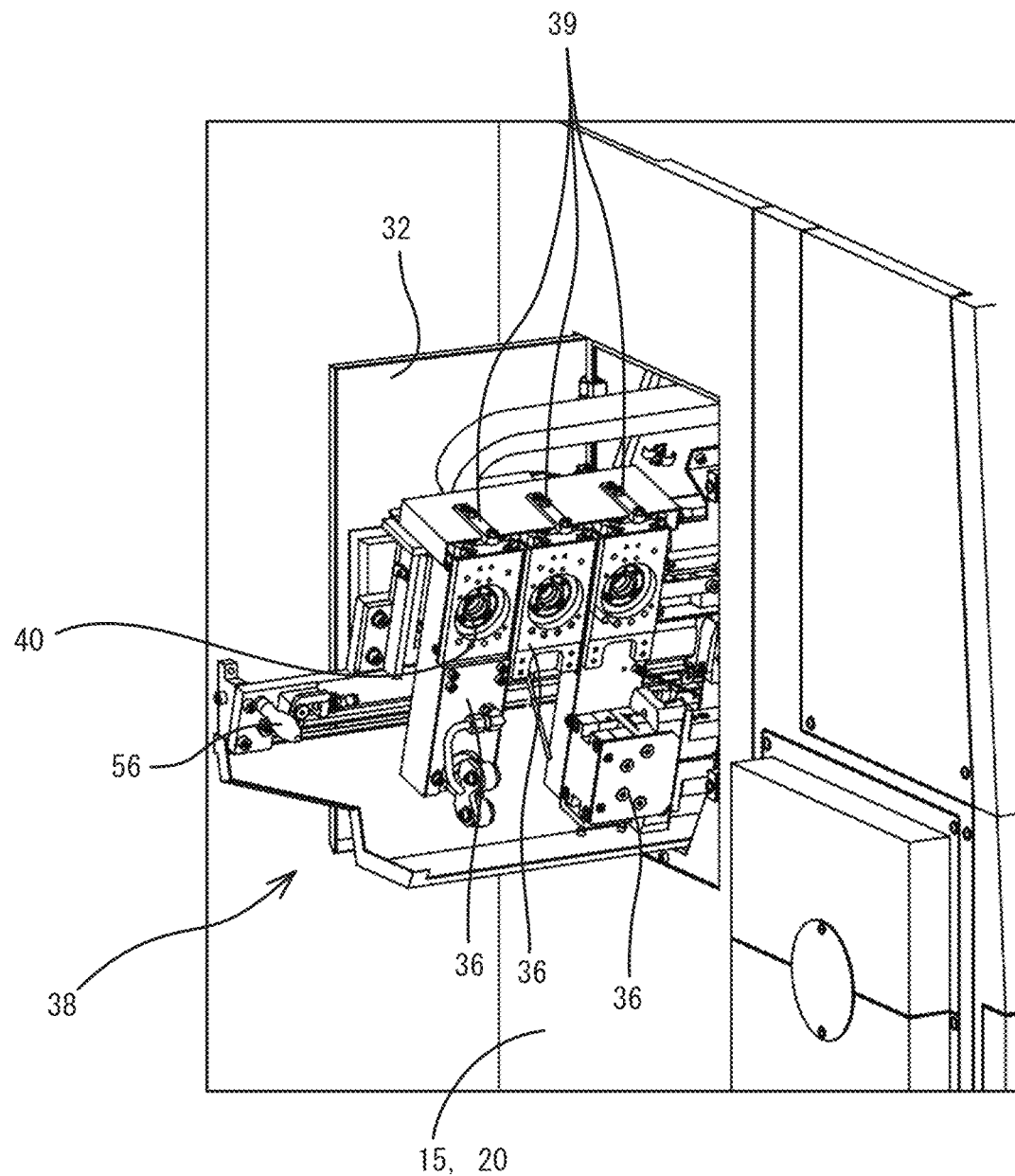
FIG. 5 is a perspective view showing a state where the stocker is advanced to the outside of the machine tool.

Hereinafter, a configuration of a machine tool 10 will be described with reference to the drawings. FIG. 1 and FIG. 2 are perspective views representing the machine tool 10, in which FIG. 1 shows a state where a front door 16 is opened, and FIG. 2 shows a state where the front door 16 is closed. FIG. 3 and FIG. 4 are enlarged views showing essential components within a machining chamber 18, in which FIG. 3 shows a state where a stocker 38 is stored, and FIG. 4 shows a state where the stocker 38 is pulled out into the machining chamber 18. FIG. 5 shows a state where the stocker 38 is pulled out into a region outside the machine tool 10.

The machine tool 10 is a machine for processing a workpiece 100 to obtain a required shape and required dimensions of the workpiece 100. The machine tool 10 may be a processing machine, such as a cutting machine (such as, for example, a lathe or a milling machine), a grinding machine (such as, for example, a grinder or a surface finisher), a forging machine, or a special processing machine (such as an electric spark machine or an ultrasonic machine), or may be a multi-tasking machining tool implemented by a combination of the processing machines. In this embodiment, explanation is provided with respect to the machine tool 10 implemented as a turning center.

The machining tool 10 includes the machining chamber 18 in which the workpiece 100 is machined. Wall surfaces and a top surface of the machining chamber 18 are covered with an interior cover 14. Further, a floor surface of the machining chamber 18 is covered with a telescopic cover which allows for movement of a below-described tool post and other components. An opening is formed in a front surface of the machining chamber 18. In the example shown in the drawings, the opening spanning from the front surface to the top surface of the machining chamber 10 is defined in a substantially midsection of the machine tool 10 in a width direction thereof.

The machine tool 10 includes the front door 16 which is opened and closed to expose and cover the opening as needed. In this embodiment, the front door 16 is formed in a substantially L shape extending from the front surface to the top surface of the machine tool 10 in order to cover the opening in its entirety. Further, the front door 16 is a sliding door configured to slide toward one side in the width direction. When the front door 16 is closed, the machining chamber 18 is isolated from the outside, which can ensure safety of an operator. The front door 16 is configured to be manually opened and closed by the operator and also configured to be automatically opened and closed by a controller.

Inside the machining chamber 18, a spindle 12 for holding one end of the workpiece 100, a tool post (not illustrated) for retaining a tool, a tail stock (not illustrated) for supporting the other end of the workpiece 100, and other components are installed. It should be noted that both the tool post and the tail stock are hidden behind an exterior cover 15 which is disposed at the rear of an operation panel 22, and thus are invisible in FIG. 2.

The spindle 12 rotatably holds the workpiece 100. A chuck 13 or other components for grasping the workpiece 100 is attached to an end surface of the spindle 12. Further, a head stock which is a drive mechanism for rotating the spindle 12 is installed at the rear of the spindle 12 (left side on the drawing paper sheet of FIG. 1). The head stock is housed within a casing 20 of the machine tool 10 that is composed of the interior cover 14 and the exterior cover 15, and cannot be visually identified from the outside.

The front surface of the machine tool 10 is also equipped with the operation panel 22. The operation panel 22 functions as an input device for receiving operation instructions from the operator, and includes, for example, a plurality of buttons, a keyboard, a touch panel, and other parts. The operation panel 22 is placed at a position which does not interfere with the front door 16 or other components, for allowing the operator to operate the operation panel 22 even under a condition that the front door 16 is closed. It should be noted that while the operation panel 22 attached to the machine tool 10 is described herein as an example, the whole or a part of the operation panel 22 may be separated from the machine tool 10. For example, an information terminal (such as a smart phone or a tablet terminal) capable of wireless communication with the machine tool 100 may be used as the operation panel 22. The instructions input from the operation panel 22 by the operator are transmitted to a controller. The controller controls actuation of the machine tool 10 and, if necessary, actuation of a robot 34, which will be described below, in accordance with the instructions from the operator.

The machine tool 10 is further equipped with the robot 34 which is actuated in a manner coordinated with the machine tool 10. In FIG. 1, the robot 34 is installed in the vicinity of the spindle 12. The robot 34 is an articulated robot including a plurality of arms connected through joints. However, the robot 34 is not limited to the above-described form, and may be modified or changed as appropriate. Therefore, the robot 34 may be another type of a robot, such as, for example, a parallel link robot, or a linear motion robot. In addition, an installation position of the robot 34 may be any position where the robot 34 is able to make access to an internal region of the machining chamber 18. For example, the robot 34 may be otherwise installed on a wall surface within the machining chamber 18, or on the tool post, the tail stock, or other components. Moreover, the robot 34 may be installed outside the machining chamber 18.

The robot 34 is provided with one or more end effectors 36. The end effectors 36 may be any elements capable of exerting an action on a target object, and are not specifically limited to a specific element. In this regard, the end effector 36 may be a holding mechanism for holding a target object, for example. Various holding forms may be employed, including a hand form in which a pair of components is used for grasping a target object, a suction holding form in which suction is used for holding a target object, a form in which magnetic or other force is used for holding a target object, and the like. In FIG. 1, the end effector 36 of the hand form is shown as an example. In another form, the end effector 36 may be a pushing mechanism for pushing a target object. For example, the end effector 36 may be implemented by a roller or the like that is configured to be pushed against the workpiece 100 for the purpose of reducing vibrations of the workpiece 100.

In a still another form, the end effector 36 may be, for example, a contact sensor for detecting the presence or absence of contact with a target object, a distance sensor for detecting a distance from a target object, a vibration sensor for detecting vibrations of a target object, a pressure sensor for detecting a pressure exerted from a target object, a sensor for detecting a temperature of a target object, or any of various other sensors. Detected results from the sensors are stored in relation to position information of the end effector 36 that is calculated from driven quantity of each of the joints, and used for analysis. For example, when the end effector 36 is the contact sensor, the controller conducts analysis based on a time at which contact with a target object is detected and position information obtained at the time, to find positions, the shape, and motions of the target object.

In a further form, the end effector 36 may be a device configured to output a fluid for assisting machining operation. Specifically, the end effector 36 may be a device configured to eject air for blowing out swarf, or a device configured to discharge a cooling fluid (such as a cutting oil or cutting water) for cooling a tool or the workpiece 100. Still further, the end effector 36 may be a device configured to eject energy or a material used for molding the workpiece 100. In this regard, the end effector 36 may be, for example, a device configured to emit a laser or electric arc, or a device configured to eject the material used for laminate molding. In another form, the end effector 36 may be a camera for capturing an image of a target object. In this case, the image captured by the camera may be displayed on the operation panel 22 or on other displays.

Meanwhile, the target object on which the end effector 36 exerts an action may be any object related to machining operation, and no other specific limitation is imposed on the target object. Accordingly, the target object may be the workpiece 100 held by the spindle 12, or may be the tool retained on the tool post. Alternatively, the target object may be an object other than the tool or the workpiece 100, such as, for example, swarf scattered within the machining chamber 18, a component part to be assembled onto the workpiece 100, or a component in the machine tool 100 (such as the chuck 13 on the spindle 12).

In the illustrated example, the robot 34 is configured to be capable of replacing the end effector 36 with another end effector 36 as needed. For example, when the robot 34 is operated to convey the workpiece 100, the end effector 36 designed as the hand mechanism may be mounted on the robot 34, or when the robot 34 is operated to sense the temperature of the tool being in action, the end effector 36 designed as the temperature sensor may be mounted on the robot 34. When the end effectors 36 are configured to be replaceable, versatility of the robot 34 can be enhanced.

For the end effectors 36 to be replaced, the machine tool 10 in this example is equipped with an end effector stocker (hereinafter, simply referred to as a "stocker") 38. The stocker 38 is a housing member including one or more holder units 39 for holding the end effectors 36. In this example, the stocker 38 is incorporated into the casing 20 of the machine tool 10.

FIG. 3 and FIG. 4 are perspective views showing a portion of the machine tool 10 around the stocker 38, in which FIG. 3 shows the stocker 38 in a stored state, and FIG. 4 shows the stocker 38 in a state of being pulled out into the machining chamber 18. FIG. 5 is a perspective view showing the stocker 38 which is pulled out into a region outside the machine tool 10 (hereinafter, the region is referred to as an "external region"). As shown in FIG. 3 and FIG. 4, the stocker 38 in this example is incorporated in the casing 20 in which the head stock is housed, and the stocker 38 is positioned at the rear of the head stock. The stocker 38 is designed to be slidable along a width direction of the machine tool 10 by means of a below-described slide mechanism, and is thus advanceable bilaterally into the machining chamber 18 and into the external region. Hereinafter, sliding directions of the stocker 38 are defined such that the direction in which the stocker 38 advances toward the inside the machining chamber 18 is referred to as a second direction, while the direction in which the stocker 28 advances toward the external region is referred to as a first direction. In addition, a state of the stocker 38 being stored in the casing 20 is referred to as a "stored state".

The stocker 38 is equipped with one or more (three, in the illustrated example) holder units 39, and each of the holder units 39 can hold the end effector 36. In this example, the holder unit 39 is configured to hold the end effectors 36 in a suspending manner.

The holder unit 39 may have a structure which enables the robot 34 to automatically replace the end effector 36. For example, the robot 34 and the end effector 36 typically include their own coupling sections which are designed to couple the robot 34 and the end effector 36. The holder unit 39 may hold the end effector 36 in a position where a coupling section 40 (a hole in FIG. 5) of the end effector 36 is exposed to the outside when the stocker 38 is pulled out. In this arrangement, a coupling section of the robot 34 can be easily coupled to the coupling section 40 of the end effector 36 by operating the robot 34. The holder unit 39 may include a clamp mechanism for enabling and disabling detachment of the end effector 36 from the holder unit 39. This can prevent unintentional detachment of the end effector 36.

In addition, actuation of the clamp mechanism may be coordinated with an action of replacing the end effector 36. For example, in operation to dismount the end effector 36 from the robot 34, the robot 34 is operated to suspend, on the holder unit 39, the end effector 36 which is presently mounted on the robot 34. Then, after disengaging the coupling between the coupling sections, the robot 34 is operated to leave the holder unit 39. At the time of the leaving, the clamp mechanism is turned on to clamp the end effector 36 on the holder unit 39, which can ensure that the end effector 36 is not moved together with the robot 34 and is reliably dismounted from the robot 34. In this example, three holder units 39 are arranged side by side in the sliding direction. However, the number of holder units 39 and placement layout thereof may be changed as appropriate.

A shutter 30 is fixedly attached to an end of the stocker 38 on a machining chamber 18 side. When the stocker 38 is in the stored state, the shutter 30 is joined to the interior cover 14 of the machining chamber 18 as shown in FIG. 3, to thereby cooperatively constitute an inner wall of the machining chamber 18. On the other hand, when the stocker 38 is pulled out into the machining chamber 18, the shutter 30 travels together with the stocker 38.

As shown in FIG. 5, an external door 32 is disposed on the exterior cover 15 at a location immediately to the left of the stocker 38. The external door 32 is manually or automatically opened and closed. When the external door 32 is opened, it becomes possible to make access to the stocker 38 from the external region. Then, in a state where the external door 32 is opened, the operator can pull out the stocker 38 into the external region.

For a sliding action of the stocker 38, two slide mechanisms are installed in the machine tool 10. This will be explained below with reference to FIG. 6A, FIG. 6B, FIG.

Figure 6A:
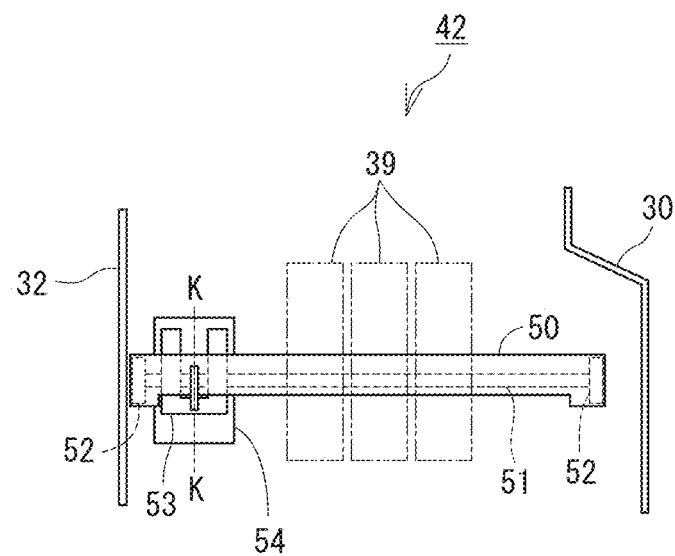
FIG. 6A is a diagram showing a general configuration of a first slide mechanism.
Figure 6B:
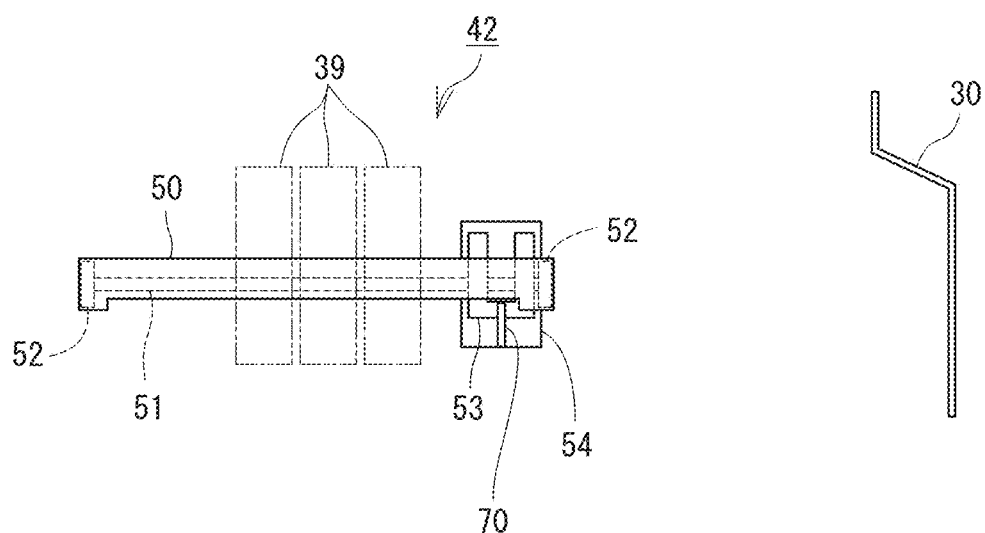
FIG. 6B is a diagram showing the general configuration of the first slide mechanism.
Figure 7A:
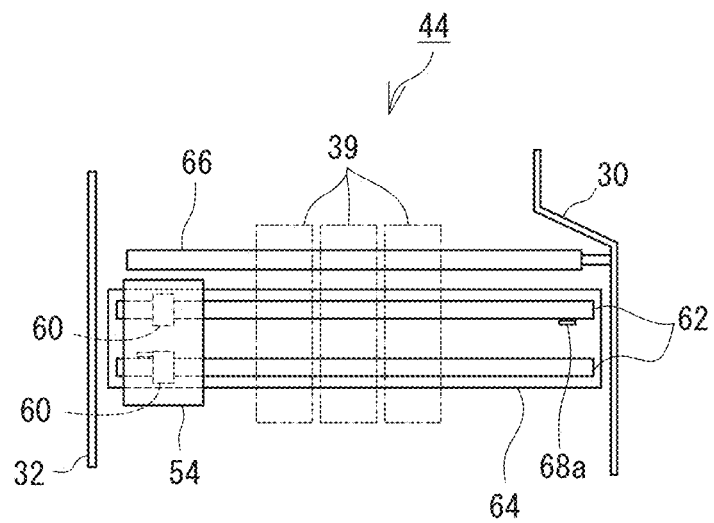
FIG. 7A is a diagram showing a general configuration of a second slide mechanism.
Figure 7B:
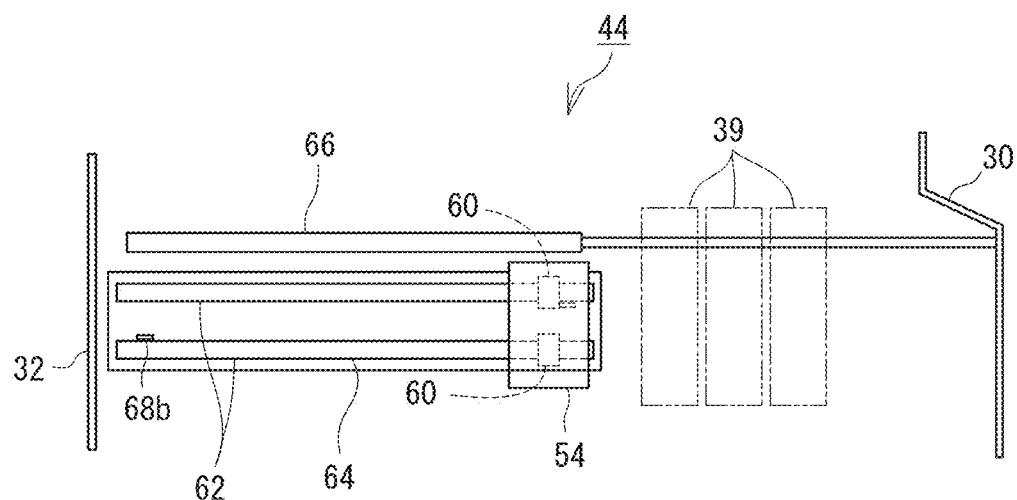
FIG. 7B is a diagram showing the general configuration of the second slide mechanism.
Figure 8A:
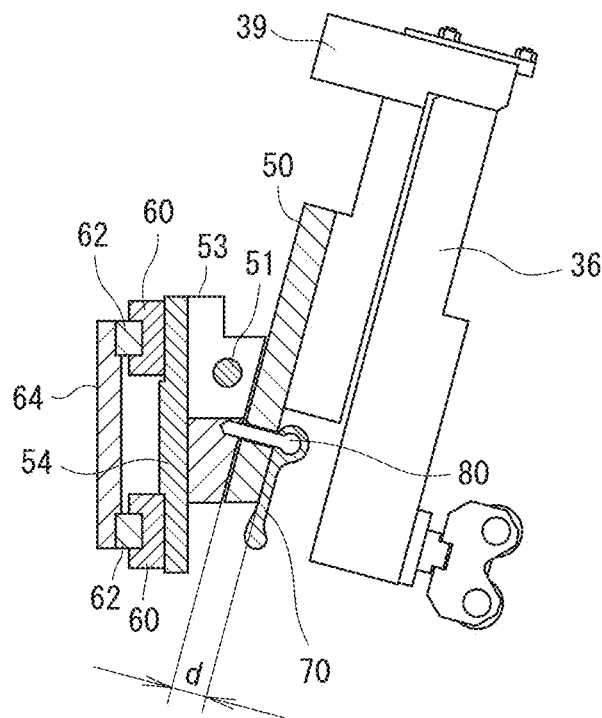
FIG. 8A is a cross section view taken along a line K-K indicated in FIG. 6A.
Figure 8B:
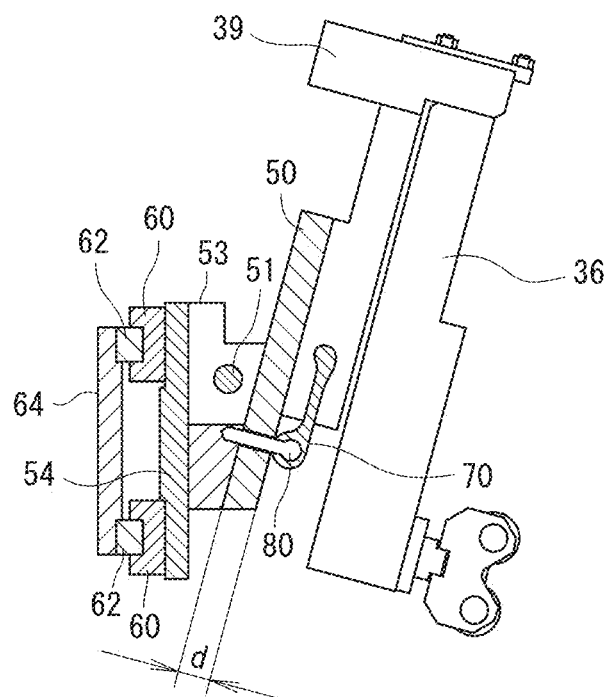
FIG. 8B is a cross section view taken along the line K-K indicated in FIG. 6A.

7A, FIG. 7B, FIG. 8A, and FIG. 8B. FIG. 6A and FIG. 6B are general views for explaining components of a first slide mechanism 42. FIG. 7A and FIG. 7B are general views for explaining components of a second slide mechanism 44. Further, FIG. 8A and FIG. 8B are general cross section views taken along a line K-K indicated in FIG. 6A.

The first slide mechanism 42 is configured, as shown in FIG. 6 and FIG. 8, to retain the stocker 38 in a state slidable toward the external region (i.e. in the first direction). The first slide mechanism 42 includes a first base plate 50 which is fixed to the stocker 38, a guide shaft 51 which is joined to the first base plate 50 via a support member 52, a guide block 53 which is configured to slidably retain the guide shaft 51, and a block base 54 on which the guide block 53 is fixed. The first base plate 50 is a long flat plate elongating in the sliding direction, and each longitudinal end of the first base plate 50 is fixed to one of a pair of the support members 52 in such a manner that the pair of support members 52 are protruded from a back surface of the first base plate 50. The guide shaft 51 is arranged on a back surface side of the first base plate 50 so as to extend along a direction parallel to the first base plate 50. The ends of the guide shaft 51 are retained by the pair of support members 52 fixed to the first base plate 50.

The guide block 53 is a block shaped member with a guide hole into which the guide shaft 51 can be inserted. A sliding motion of the guide shaft 51 through the guide hole can cause a sliding motion of the first base plate 50 and thus a sliding motion of the stocker 38 fixed to the first base plate 50. The guide block 53 is fixed to the block base 54. Further, the guide block 53 is also attached to a lock lever 70 for locking the sliding motion of the first base plate 50, which will be described further below. In addition, because a handle 56 (see FIG. 5) to be gripped by a user is disposed on a left end of the first base plate 50, the user can grip the handle 56 to advance or retreat the stocker 38 in the external region.

As shown in FIG. 7 and FIG. 8, the second slide mechanism 44 retains the stocker 38 together with the first slide mechanism 42 in a state slidable into the machining chamber 18 (in the second direction). The second slide mechanism 44 includes a slider 60 fixed to the block base 54, guide rails 62 for guiding a sliding motion of the slider 60, a second base plate 64 on which the guide rails 62 are fixedly mounted, and an air cylinder 66 fixed to the inside of the casing 20. Because a distal end of an extendable shaft of the air cylinder 66 is fixed to the shutter 30, the shutter 30 is advanced or retreated within the machining chamber 18 when the air cylinder 66 is extended or retracted. In addition, the shutter 30 is mechanically connected to the block base 54 via a not-illustrated connection member. Because of this, the block base 54 is configured to be slidable on the guide rails 62 in response to the advancing or retreating motion of the shutter 30. It should be noted that, in this example, the air cylinder 66 is presented as an example of an actuator for sliding the stocker 38 in the second direction, while another actuator, such as, for example, a motor or a hydraulic cylinder, may be used. Alternatively, the actuator may be omitted, and the robot 34 may be used for advancing or retreating the shutter 30 (or advancing or retreating the second slide mechanism 44).

Meanwhile, the second base plate 64 is equipped with two stoppers 68a and 68b which are brought into contact with the slider 60, to thereby apply a limitation to a travel range of the slider 60. The first stopper 68a is disposed in the vicinity of a right end of the guide rails 62 (i.e., an end close to the machining chamber 18), and is accordingly configured to make contact with the slider 60 when the stocker 38 is completely advanced into the machining chamber 18, which is intended to prevent a further advancing motion of the stocker 38. On the other hand, the second stopper 68b is disposed in the vicinity of a left end of the guide rail 62 (i.e., an end close to the external region), and is accordingly configured to make contact with the slider 60 when the stocker 38 is completely stored within the casing 20, which is intended to prevent a further retreating motion of the stocker 38.

A travel range of the first slide mechanism 42 is limited by physical contact between the support member 52 which supports the both ends of the guide shaft 51 and the guide block 53. As opposed to the second slide mechanism 44, the first slide mechanism 42 is intended to be manually pulled out. For this reason, the first slide mechanism 42 is designed to be easily slid state without constraints. In this case, if the air cylinder 66 is extended in order to advance the stocker 38 together with the first slide mechanism 42 into the machining chamber 18, the first slide mechanism 42 might be slid relative to the second slide mechanism 44, which poses a danger that the position of the stocker 38 will become unstable.

To eliminate the danger, the second slide mechanism 44 is provided with a lock mechanism for locking the sliding motion of the first slide mechanism 42 relative to the second slide mechanism 44. The lock mechanism includes the lock lever 70 connected to the guide block 53. The lock lever 70 is, as shown in FIG. 8, attached to a support shaft 80 erectly mounted on the guide block 53, and is designed to be pivotable about an axis parallel to the sliding direction. A through hole in which the support shaft 80 is inserted is defined in the first base plate 50, and the first base plate 50 is movable along the support shaft 80 in a thickness direction of the first base plate 50.

Abase end of the lock lever 70 constitutes a cam having a substantially circular shape which is eccentric relative to a pivot center. Because of this, a gap d between the base end of the lock lever 70 and the guide block 53 is varied by pivoting the lock lever 70. Specifically, when a tip end of the lock lever 70 is brought into an orientation pointing upward, the gap d becomes equal to or slightly smaller than the thickness of the first base plate 50, and when the tip end of the lock lever 70 is brought into an orientation pointing downward, the gap d becomes greater than the thickness of the base plate 50.

When the lock lever 70 is turned to a release position with the tip end pointing downward as shown in FIG. 8A, because the gap d becomes greater than the thickness of the first base plate 50, a small interstice is formed between the first base plate 50 and the guide block 53. As a result, the first base plate 50 becomes able to slide relative to the guide block 53. On the other hand, when the lock lever 70 is turned, as shown in FIG. 8B, to a lock position with the tip end pointing upward, because the gap d becomes equal to or slightly smaller than the thickness of the first base plate 50, the tip end of the lock lever 70 is brought into contact with the first base 50, thereby pushing the first base plate 50. Then, the first base plate 50 pushed by the lock lever 70 is warped toward the guide block 53 and brought into contact with the guide block 53. As a result, the friction between the first base plate 50 and the guide block 53 is increased to an extent of hindering the sliding motion of the first base plate 50.

In this connection, a second lever to be engaged with the lock lever 70 may be arranged to prevent a possibility that the lock lever 70 in the lock position will be turned downward by gravity. Moreover, a sensor for detecting the orientation of the lock lever 70 may be installed to control various movements based on the detected result from the sensor. For example, the sliding motion toward the inside of the machining chamber 18 implemented by the second slide mechanism 44 may be disabled under a condition that the lock lever 70 remains in the release position. In addition, a sensor for detecting opening and closing of the external door 32 may be mounted on the external door 32, and an alarm of some kind may be output when closure of the external door 32 is detected under the condition that the lock lever 70 remains in the release position. Alternatively, rather than the sensor, a mechanical arrangement may be used for preventing a failure to lock the lock lever 70. For example, the external door 32 may be provided with a member configured to interfere with the lock lever 70 in the downward pointing orientation, to thereby mechanically prevent closure of the external door 32 when the lock lever 70 remains in the downward pointing orientation.

Next, a flow of using the above-described machine tool 10 will be described, focusing attention on the handling of the end effector 36. When the workpiece 100 is machined using the machine tool 10, the robot 34 is utilized as necessary. To enhance versatility of the robot 34, the end effectors 36 are previously set in the stocker 38 in this example. The setting of the end effectors 36 is performed by a user.

Specifically, the user firstly opens the external door 32 on the exterior cover 15. Following this, the user turns the lock lever 70, which is in the lock position at the time of opening the external door 32, by 180 degrees in order to shift the lock lever 70 to the release position. This causes the first base plate 50 to be separated from the guide block 53, and accordingly enables the user to pull out the stocker 38 in the first direction (toward the external region). In this state, the user grips the handle 56 and pulls out the stocker 38 to the external region.

When the stocker 38 is exposed in the external region, the user sets replaceable end effectors 36 to the holder unit 39 of the stocker 38. After the end effectors 36 are set, the user pushes back the stocker 38 into the casing 20. When the stocker 38 is established in a stored state where it is entirely stored within the casing 20, the user turns the lock lever 70 by 180 degrees to the lock position, and subsequently closes the external door 32.

In a state where the end effectors 36 are set in the stocker 38, it becomes possible for the machine tool 10 to start machining the workpiece 100. The robot 34 is used as needed for assisting the machining of the workpiece 100. For example, the workpiece 100 may be, in some cases, conveyed by the robot 34 in order to set the workpiece 100 onto the spindle 12. In this case, it is necessary for the robot 34 to be equipped with the end effector 36 capable of holding the workpiece 100, such as, for example, the hand mechanism.

To equip the robot 34 with the end effector 36, the controller actuates the air cylinder 66 disposed on the second slide mechanism 44 to slide the slider 60 in the second direction. As a result, the stocker 38 is advanced together with the first slide mechanism 42 into the machining chamber 18. In this state, the controller operates the robot 34 to move the coupling section of the robot 34 to the coupling section of the end effector 36 held by the holder unit 39 for connecting the coupling sections of the robot 34 and the end effector 36 to each other. After the end effector 36 is mounted on the coupling section of the robot 34, the robot 34 is operated to leave the stocker 38 and placed on standby at a predetermined waiting position. During this operation, the controller actuates the air cylinder 66 to slide the slider 60 into the casing 20 for storing the stocker 38 together with the first slide mechanism 42 within the casing 20. When the stocker 38 is stored within the casing 20, an available space inside the machining chamber 18 is increased, which can provide sufficient space for operation to machine the workpiece 100, motions of the robot 34, and other uses.

After the hand mechanism as the end effector 36 is mounted on the robot 34, the robot 34 is operated to use the mounted end effector 36 for holding the workpiece 100 and setting the workpiece 100 on the spindle 12. In this state, the controller causes the tool to start machining the workpiece 100. During the machining, it is desired that the workpiece 100 be pushed by a roller in order to suppress vibrations of the workpiece 100 in process. As a measure to satisfy the desire, there may be considered mounting the end effector 36, being a type of roller, on the robot 34 to push the workpiece 100 by means of the end effector 36.

In this case, before starting the operation to machine the workpiece 100, the end effector 36 mounted on the robot 34 is replaced with another one. Specifically, the air cylinder 66 is actuated to advance the stocker 38 into the machining chamber 18. Firstly, the controller operates the robot 34 to place, on an empty holder unit 39, the end effector 36, which is the hand mechanism presently mounted as the end effector 36 on the robot 34, and dismount the end effector 36 being the hand mechanism from the robot 34. Secondly, the controller operates the robot 34 to move the coupling section of the robot 34 to a coupling section of the roller type end effector 36, and establish connection therebetween for mounting the roller type end effector 36 onto the robot 36. In this state, the controller again actuates the air cylinder to store the stocker 38 within the casing 20. From then on, the operation to machine the workpiece 100 is performed while appropriately replacing the end effectors 36.

As can be understood from the above description, the stocker 38 for the end effectors 36 is arranged in this specification, such that the stocker 38 can be stored within the casing 20 of the machine tool 10. Because the stocker 38 which is stored within the casing 20 constitutes no obstacle to actions of the robot 34 and the operator, workability of the robot 34 and the operator can be improved. Further, because the end effector 36 can be bilaterally advanced into the machining chamber 18 and the external region, both the robot 34 and the operator are able to have access to the end effector 36, which can facilitate setting the end effector 36 by the operator and replacement of the end effectors 36 by the robot. Still further, in this specification, the lock mechanism (the lock lever 70) is disposed on the first slide mechanism 42 to disable the sliding motion of the first slide mechanism 42, so that the sliding motion of the stocker 38 in the first direction (toward the external region) can be easily restricted.

The above described structure is presented by way of illustration, and may be modified or changed as appropriate, other than the stocker 38 which can be stored at least within the casing 20 of the machine tool 10. For example, in this example the stocker 38 is configured to be slidable, while the stocker 38 may be configured to be rotatable rather than being slidable. In addition, the shape, the sliding direction, the installation position, and other features of the stocker 38 may be changed as needed.

REFERENCE SIGNS LIST 10 machine tool, 12 spindle, 13 chuck, 14 interior cover, 15 exterior cover, 16 front door, 18 machining chamber, 20 casing, 22 operation panel, 30 shutter, 32 external door, 34 robot, 36 end effector, 38 stocker, 39 holder unit, 40 coupling section, 42 first slide mechanism, 44 second slide mechanism, 50 first base plate, 51 guide shaft, 52 support member, 53 guide block, 54 block base, 56 handle, 60 slider, 62 guide rail, 64 second base plate, 66 air cylinder, 68*a* first stopper, 68*b* second stopper, 70 lock lever, 80 support shaft, 100 workpiece.

The invention claimed is:

1. A machine tool comprising:
    a spindle protruding from a first wall face of a machining chamber,
    an articulated arm robot protruding from the first wall face,
    a stocker including at least two effector holder units, each of the at least two effector holder units configured for holding a respective end effector so that at least one end effector of the end effectors is to be mounted on the robot,
    a first slide mechanism which retains the stocker in a state in which the stocker is slidable between a stored location where an entirety of the stocker is stored within a casing of the machine tool and an external region which is external to the casing of the machine tool, and
    a second slide mechanism which together with the first slide mechanism retains the stocker in a state in which the stocker is slidable between the stored location and the machining chamber of the machine tool, the second slide mechanism comprising a guide rail on which the stocker is slidable,
    wherein when the stocker is at the stored location: an entirety of the guide rail is stored in the casing,
    the stocker is disposed adjacent to the first wall face and within the casing of the machine tool, and
    a shutter is fixed to an end of the second slide mechanism that is adjacent to the machining chamber, the shutter forming an inner wall of the machining chamber and being continuous with the first wall face.

2. The machine tool according to claim 1, wherein at least a part of the stocker is advanceable from the casing of the machine tool into the machining chamber of the machine tool and advanceable from the casing of the machine tool to the external region which is external to the casing of the machine tool.

3. The machine tool according to claim 1,
    wherein the first slide mechanism comprises:
        a block base that is slidable along the guide rail; and
        a guide shaft that is slidable relative to the block base and coupled to the stocker.

4. The machine tool according to claim 1, further comprising:
    a handle disposed on the first slide mechanism in the stored location and non-exposed by the casing when the stocker is at the stored location, and slid external to the casing when the stocker is moved external to the casing.

* * * * *